(12) United States Patent
Ye et al.

(10) Patent No.: US 11,010,072 B2
(45) Date of Patent: May 18, 2021

(54) DATA STORAGE, DISTRIBUTION, RECONSTRUCTION AND RECOVERY METHODS AND DEVICES, AND DATA PROCESSING SYSTEM

(71) Applicant: HANGZHOU HIKVISION DIGITAL TECHNOLOGY CO., LTD., Hangzhou (CN)

(72) Inventors: Min Ye, Hangzhou (CN); Peng Lin, Hangzhou (CN); Weichun Wang, Hangzhou (CN); Qiqian Lin, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/495,042

(22) PCT Filed: Mar. 16, 2018

(86) PCT No.: PCT/CN2018/079277
§ 371 (c)(1),
(2) Date: Sep. 17, 2019

(87) PCT Pub. No.: WO2018/166526
PCT Pub. Date: Sep. 20, 2018

(65) Prior Publication Data
US 2020/0097199 A1  Mar. 26, 2020

(30) Foreign Application Priority Data
Mar. 17, 2017 (CN) .................. 201710162001.X

(51) Int. Cl.
*G06F 3/06* (2006.01)

(52) U.S. Cl.
CPC .......... *G06F 3/0631* (2013.01); *G06F 3/0619* (2013.01); *G06F 3/0689* (2013.01)

(58) Field of Classification Search
CPC ...... G06F 3/0619; G06F 3/062; G06F 3/0629; G06F 3/0631; G06F 3/065; G06F 3/0665;
(Continued)

(56) References Cited

U.S. PATENT DOCUMENTS 8,473,778 B2  6/2013  Simitci et al.
9,672,905 B1*  6/2017  Gold .................. G06F 3/065
(Continued)

FOREIGN PATENT DOCUMENTS

CN  101175011  5/2008
CN  102279777  12/2011
(Continued)

OTHER PUBLICATIONS

"Data striping". *Wikipedia*, Jan. 3, 2017, 3 pages https://en.wikipedia.org/w/index.php?title=Data striping&oldid=758134058.
(Continued)

*Primary Examiner* — Aracelis Ruiz
(74) *Attorney, Agent, or Firm* — Norton Rose Fulbright US LLP

(57) ABSTRACT

Embodiments of the present application provide a method and apparatus for displaying objects. In the method, data segments of to-be-stored data are stored in storage objects. A storage object is a minimum unit for data storage. The difference between the number of data segments stored in a storage object and that of another storage object is no more than a first preset threshold. Data segments are equally stored, to the greatest extent, into storage objects. The case that data having segments lost due to failure of a storage object cannot be restored is avoided.

17 Claims, 5 Drawing Sheets

(58) Field of Classification Search
CPC ........ G06F 3/067; G06F 3/0688; G06F 3/068; G06F 11/08
See application file for complete search history.

(56) References Cited

U.S. PATENT DOCUMENTS

| | | | |
|---|---|---|---|
| 10,019,323 B1* | 7/2018 | Bai | ................ G06F 11/1435 |
| 2011/0208996 A1 | 8/2011 | Hafner et al. | |
| 2012/0060072 A1 | 3/2012 | Simitci et al. | |
| 2013/0339818 A1 | 12/2013 | Baker et al. | |
| 2016/0232055 A1* | 8/2016 | Vairavanathan | .......... G06F 3/06 |

FOREIGN PATENT DOCUMENTS

| CN | 103136215 | 6/2013 |
|---|---|---|
| CN | 103257831 | 8/2013 |
| CN | 103631539 | 3/2014 |
| CN | 105159603 | 12/2015 |
| CN | 105630423 | 6/2016 |
| CN | 105760116 | 7/2016 |

OTHER PUBLICATIONS

Extended European Search Report issued in corresponding European application No. 18768099.6, dated Feb. 26, 2020.
Office Action issued in corresponding Chinese application No. 201710162001.X, dated Apr. 8, 2020 (English Translation Provided).
Office Action issued in corresponding Chinese Application No. 201710162001.X, dated Oct. 29, 2019 (machine translation provided).
International Search Report and Written Opinion issued in International Application No. PCT/CN2018/079277, dated May 30, 2018.

* cited by examiner

DATA STORAGE, DISTRIBUTION, RECONSTRUCTION AND RECOVERY METHODS AND DEVICES, AND DATA PROCESSING SYSTEM

CROSS-REFERENCE TO RELATED APPLICATIONS

The present application is a national phase under 35 U.S.C. § 371 of International Application No. PCT/CN2018/079277, filed Mar. 16, 2018, which claims priority to Chinese patent application No. 201710162001.X filed with the State Intellectual Property Office of People's Republic of China on Mar. 17, 2017 and entitled "Data Storage, Distribution, Reconstruction, and Recovery Methods and Devices, and Data Processing System", each of which are incorporated herein by reference in their entirety.

TECHNICAL FIELD

The present application relates to the field of data processing, and in particular, to a method and apparatus for data storage, distribution, reconstruction, and recovery, and a data processing system.

BACKGROUND

Redundant Arrays of Independent Disks (RAID) is a technology in which multiple disks are combined into a single disk of massive storage and data is divided to be stored in the disks.

Data in RAID is typically protected through erasure coding (EC). An erasure coding strategy may be represented by n=k+m, wherein, k is the number of original segments, m is the number of redundant segments, and n is a total number of data segments. Specifically, to-be-stored data can be divided into k original segments, and based on the original segments, redundant segments are obtained by expansion and encoding. The k original segments and m redundant segments are stored respectively in disks. As such, in an event of data loss due to the failure of some of the disks, lost data segments can be restored based on remaining original segments and redundant segments.

In the above solution, typically, data segments (original segments and redundant segments) are randomly stored in disks. A case may occur that a plurality of data segments stored in one disk are all lost upon a failure of the disk. Data is unable to be restored in this case.

SUMMARY OF THE INVENTION

Embodiments of the present application provide a method and apparatus for data storage, distribution, reconstruction, and recovery, and a data processing system, so as to prevent the case that a plurality of data segments stored in one disk are all lost upon a failure of the disk and is unable to be restored.

For the purpose above, embodiments of the present application disclose a method for data storage. The method includes:

assigning x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;

performing data division and redundancy processing to the to-be-stored data according to the erasure coding strategy of k+m, to obtain k+m data segments;

storing the k+m data segments into x storage objects, wherein, the difference between the number of data segments stored in a storage object and that of another storage object is no more than a first preset threshold; and recording index information for the to-be-stored data, the index information comprising correspondence between each of data segments and a storage object in which the data segment is stored.

For the purpose above, embodiments of the present application further disclose a method for data distribution including:

determining index information for distribution in recorded index information; wherein, the recorded index information comprises correspondence between each of data segments and a storage object in which the data segment is stored, and a storage object is a minimum unit for data storage;

determining to-be-distributed data segments according to the determined index information for distribution;

assigning distributed storage objects to the to-be-distributed data segments; and storing the to-be-distributed data segments into the distributed storage objects.

For the purpose above, embodiments of the present application further disclose a method for data reconstruction including:

determining index information for construction in recorded index information; wherein, the recorded index information comprises correspondence between each of data segments and a storage object in which the data segment is stored, the index information for reconstruction contains information of a fault storage object, and a storage object is a minimum unit for data storage;

reading, according to information of fault-free storage objects contained in the index information for reconstruction, target data segments from the fault-free storage objects, the target data segments being data segments of the data to be reconstructed associated with the information index for reconstruction;

obtaining a restored segment through reconstruction with the target data segments; and storing the restored segment into an assigned storage object.

For the purpose above, embodiments of the present application further disclose a method for data recovery including:

determining index information for recovery in recorded index information; wherein, the recorded index information comprises correspondence between each of data segments and a storage object in which the data segment is stored, and a storage object is a minimum unit for data storage;

determining to-be-recovered data segments according to the index information for recovery;

assigning storage objects to the to-be-recovered data segments; and storing the to-be-recovered data segments into the assigned storage objects.

For the purpose above, embodiments of the present application further disclose a apparatus for data storage including:

a first assigning module, configured for assigning x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;

a division module, configured for performing data division and redundancy processing to the to-be-stored data according to the erasure coding strategy of k+m, to obtain k+m data segments;

a first storing module, configured for storing the k+m data segments into x storage objects, wherein, the difference between the number of data segments stored in a storage object and that of another storage object is no more than a first preset threshold; and a first recording module, configured for recording index information for the to-be-stored data, the index information comprising correspondence between each of data segments and a storage object in which the data segment is stored.

For the purpose above, embodiments of the present application further disclose a apparatus for data distribution including:

a first determining module, configured for distribution in recorded index information; wherein, the recorded index information comprises correspondence between each of data segments and a storage object in which the data segment is stored, and a storage object is a minimum unit for data storage;

a second determining module, configured for determining to-be-distributed data segments according to the determined index information for distribution;

a second assigning module, configured for assigning distributed storage objects to the to-be-distributed data segments; and a second storing module, configured for storing the to-be-distributed data segments into the distributed storage objects.

For the purpose above, embodiments of the present application further disclose a apparatus for data reconstruction, including:

a third determining module, configured for determining index information for construction in recorded index information; wherein, the recorded index information comprises correspondence between each of data segments and a storage object in which the data segment is stored, the index information for reconstruction contains information of a fault storage object, and a storage object is a minimum unit for data storage;

a reading module, configured for reading, according to information of fault-free storage objects contained in the index information for reconstruction, target data segments from the fault-free storage objects, the target data segments being data segments of the data to be reconstructed associated with the information index for reconstruction;

a reconstructing module, configured for obtaining a restored segment through reconstruction with the target data segments; and a third storing module, configured for storing the restored segment into an assigned storage object.

For the purpose above, embodiments of the present application further disclose a apparatus for data recovery including:

a fourth determining module, configured for determining index information for recovery in recorded index information; wherein, the recorded index information comprises correspondence between each of data segments and a storage object in which the data segment is stored, and a storage object is a minimum unit for data storage;

a fifth determining module, configured for determining to-be-recovered data segments according to the index information for recovery;

a third assigning module, configured for assigning storage objects to the to-be-recovered data segments;

a fourth storing module, configured for storing the to-be-recovered data segments into the assigned storage objects;

a second recording module, configured for recording correspondence between each of to-be-recovered data segments and a storage object in which the to-be-recovered data segment is stored; and a replacing module, configured for generating, according to the recorded correspondence, new index information to replace the index information for recovery.

For the purpose above, embodiments of the present application further disclose a data processing system comprising a platform server and a managing server, wherein, the platform server assigns x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;

the managing server performs data division and redundancy processing to the to-be-stored data according to the erasure coding strategy of k+m, to obtain k+m data segments; and stores the k+m data segments into x storage objects, wherein, the difference between the number of data segments stored in a storage object and that of another storage object is no more than a first preset threshold;

the platform server records i index information for the to-be-stored data, the index information comprising correspondence between each of data segments and a storage object in which the data segment is stored.

Optionally, the platform server determines index information for data to be read;

the managing server reads data segments of the data to be read from the storage objects according to the index information determined by the platform server; and combines the data segments as read so as to obtain the data to be read.

Optionally, the platform server determines index information for distribution in recorded index information;

the managing server determines to-be-distributed data segments according to the determined index information for distribution; assigns distributed storage objects to the to-be-distributed data segments; and stores the to-be-distributed data segments into the distributed storage objects;

the platform server updates the index information for distribution;

or, the system further comprises an auditing server, the platform server determines index information for distribution in recorded index information;

the auditing server determines to-be-distributed data segments according to the determined index information for distribution; assigns distributed storage objects to the to-be-distributed data segments; and stores the to-be-distributed data segments into the distributed storage objects;

the platform server updates the index information for distribution.

Optionally, the platform server determines index information for construction in recorded index information; wherein, the index information for reconstruction contains information of a fault storage object;

the managing server reads, according to information of fault-free storage objects contained in the index information for reconstruction, target data segments from the fault-free storage objects, the target data segments being data segments of the data to be reconstructed associated with the information index for reconstruction; obtains a restored segment through reconstruction with the target data segments; and stores the restored segment into an assigned storage object;

the platform server updates the index information for reconstruction;

or, the system further comprises an auditing server, the platform server determines index information for construction in recorded index information; wherein, the index information for reconstruction contains information of a fault storage object;

the auditing server reads, according to information of fault-free storage objects contained in the index information for reconstruction, target data segments from the fault-free storage objects, the target data segments being data segments of the data to be reconstructed associated with the information index for reconstruction; obtains a restored segment through reconstruction with the target data segments; and stores the restored segment into an assigned storage object;

the platform server updates the index information for reconstruction.

Optionally, the platform server determines index information for recovery in recorded index information;

the managing server determines to-be-recovered data segments according to the index information for recovery;

the platform server assigns storage objects to the to-be-recovered data segments;

the managing server the to-be-recovered data segments into the assigned storage objects;

the platform server records correspondence between each of to-be-recovered data segments and a storage object in which the to-be-recovered data segment is stored; and generates, according to the recorded correspondence, new index information to replace the index information for recovery;

or, the system further comprises an auditing server, the platform server determines index information for recovery in recorded index information;

the auditing server determines to-be-recovered data segments according to the index information for recovery;

the platform server assigns storage objects to the to-be-recovered data segments;

the auditing server the to-be-recovered data segments into the assigned storage objects;

the platform server records correspondence between each of to-be-recovered data segments and a storage object in which the to-be-recovered data segment is stored; and generates, according to the recorded correspondence, new index information to replace the index information for recovery.

Optionally, the system may further include a storage server containing multiple storage objects;

the storage server reports operating status information of the storage objects to the platform server, so that the platform server assigns storage objects to to-be-stored data, assigns distributed storage objects to the to-be-distributed data segments, and determines index information for reconstruction, based on the operating status information reported by the storage server.

For the purpose above, embodiments of the present application further disclose an electronic device comprising a processor and a memory, wherein, the memory is configured for storing executable program codes, and the processor reads and executes the executable program codes stored in the memory so as to perform any of above-described methods.

For the purpose above, embodiments of the present application further disclose executable program codes configured which, when executed, perform any of above-described methods.

For the purpose above, embodiments of the present application further disclose a computer readable storage medium having executable program codes stored therein which, when being executed, perform any of above-described methods.

In embodiments of the present application, to-be-stored data segments are stored in storage objects. A storage object is a minimum unit for data storage, and the difference between the number of data segments stored in a storage object and that of another storage object is no more than a first preset threshold. In other words, in the present embodiment, data segments are equally stored, to the maximum extent, into storage objects. The case that data having segments lost due to failure of a storage object cannot be restored is avoided.

Of course, any product or method of the present application does not necessarily have to achieve all the above-described advantages at the same time.

BRIEF DESCRIPTION OF THE DRAWINGS

Technical solutions of embodiments of the present application and the prior arts will be more clearly illustrated with reference to the drawings as briefly introduced below. Apparently, these drawings are only for some embodiments of the present application, and those skilled in the art can obtain other drawings based on the accompanying drawings herein without any creative efforts.

DETAILED DESCRIPTION OF THE INVENTION

To make the objectives, technical solutions, and advantages of the present application more comprehensive, a detailed description of the present application is provided below in association with embodiments and with reference to drawings. Apparently, the described embodiments are only some of, but not all the embodiments of the present application. All other embodiments derived therefrom without any creative efforts are all within the scope of the present application.

A detailed description of the present application is provided below in association with embodiments and with reference to drawings. Apparently, the described embodiments are only some of, but not all the embodiments of the present application. All other embodiments derived therefrom without any creative efforts are all within the scope of the present application.

In order to solve the above technical problem, embodiments of the present application provide a method and apparatus for data storage, distribution, reconstruction, and recovery, and a data processing system. The method and device can be applied to a server, a client, and various electronic devices. Embodiments are not limited in this aspect. A method for data storage provided by an embodiment of the present application is first described in detail below.

Figure 1:
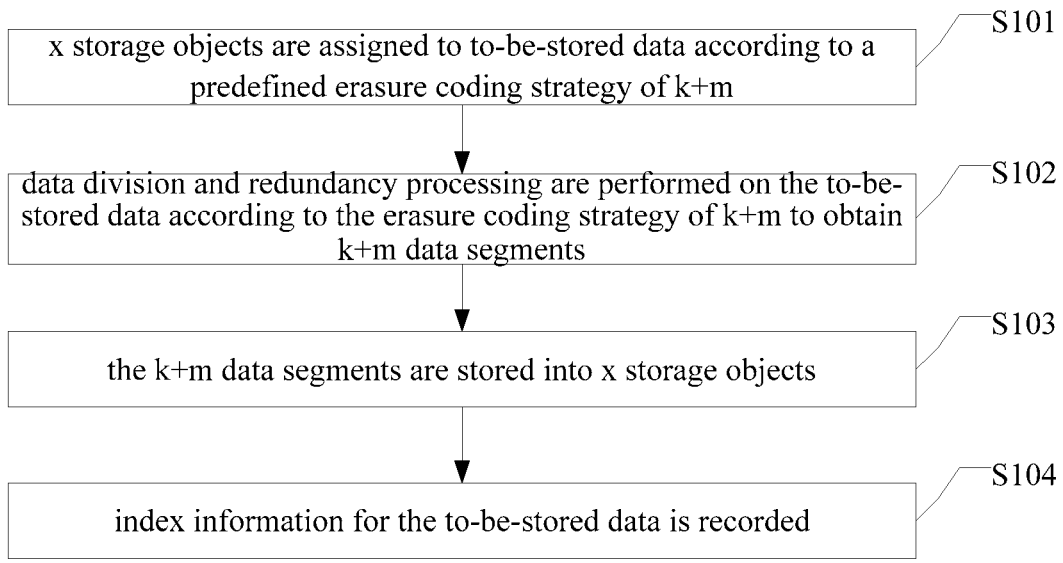
FIG. 1 is a flowchart of a method for data storage according to an embodiment of the present application.

FIG. 1 is a schematic flowchart of a method for data storage according to an embodiment of the present application. The method includes the following operations.

At S101, x storage objects are assigned to to-be-stored data according to a predefined erasure coding strategy of k+m.

K is the number of original segments, m is the number of redundant segments, and x is greater than 1 and not greater than k+m.

A storage object is a minimum unit for data storage, e.g., a minimum unit for storage of a data segment (an original segment or a redundant segment). The minimum unit and the storage object may be a disk. The minimum unit may also be a disk block if the disk can be divided into blocks. Embodiments are not limited in this aspect. In the following description, a storage object is a disk.

In one implementation, S101 may comprise the following operations:

determining whether available storage nodes are fewer than k+m;

if not fewer than k+m, determining x storage objects from the available storage nodes; wherein, each of the determined storage objects is from a different storage node, and x=k+m;

or otherwise, determining whether available storage objects of all the available storage nodes are fewer than k+m;

if not fewer than k+m, determining x storage objects from all the available storage nodes; wherein, x=k+m, and the difference between the number of data segments stored in a storage node and that of another storage node is no more than a second preset threshold;

or otherwise, assigning all the available storage objects to the to-be-stored data.

In other words, if available storage nodes are sufficient (more than k+m), k+m available storage nodes are assigned to the to-be-stored data, so that each segment of the to-be-stored data is stored in a different storage node.

If available storage nodes (fewer than k+m) are insufficient but there are sufficient available storage objects (i.e., available disks are not fewer than k+m), k+m available disks are assigned to the to-be-stored data, so that each data segment of the data is stored in a different disk. It is noted that, in the k+m available disks determined from all the available storage nodes, the difference between the number of data segments stored in a storage node and that of another storage node is no more than a second preset threshold. In other words, the data segments are equally distributed among the storage nodes.

If available disks are also insufficient (fewer than k+m), all the available disks (x available disks) are assigned to the to-be-stored data, so that data segments of the to-be-stored data can be equally distributed on storage nodes to the greatest extent.

In short, to-be-stored data is equally distributed to the greatest extent. Therefore, in case of data loss due to failure of a disk or storage node, the lost data can be restored with data segments stored in other disks and storage nodes.

In one implementation, resource utilization of storage objects may also be considered in the assignment of the storage objects to the to-be-stored data. Specifically, priority can be given to storage objects with lower resource utilization rates.

The storage objects may be assigned in various manners. Embodiments are not limited in this aspect.

At S102, data division and redundancy processing are performed on the to-be-stored data according to the erasure coding strategy of k+m to obtain k+m data segments.

Specifically, the to-be-stored data can be divided into k original segments. Redundancy processing is performed on the k original segments to obtain m redundant segments.

At S103, the k+m data segments are stored into x storage objects, wherein, the difference between the number of data segments stored in a storage object and that of another storage object is no more than a first preset threshold.

The first predefined threshold can be set as desired in practice, for example, to be 2.

The data segments can now be stored into the storage objects assigned to the to-be-stored data in S101.

As described above, in case that k+m storage nodes are assigned, each of the data segments can be stored into a storage object in a different storage node. As such, the number of data segments stored in each storage object is 1, with a difference of 0 that is smaller than the first predefined threshold.

In case that k+m storage objects (disks) are assigned, each of the data segments can be stored into a different disk. As such, the number of data segments stored in each storage object is 1, with a difference of 0, smaller than the first predefined threshold.

In case that x (less than k+m) disks are assigned, the k+m data segments can be equally divided into x parts to be stored in the x storage objects. The equal division means the k+m data segments are equally divided into x parts to the greatest extent as allowed.

In an example, k is 4, m is 2, and x is 3. In other words, 6 data segments are to be divided into 3 parts. This is allowed, and each part contains 2 data segments. Each storage object has two data segments stored thereon. Thus, the number of data segments stored in each storage object is 2, with a difference of 0 that is smaller than the first predefined threshold.

In another example, k is 4, m is 1, and x is 3, in other words, 5 data segments are to be divided into 3 parts. Equal division is not allowed. In this case, a first part may contain 2 data segments, a second part may contain 2 data segments, and a third part may contain 1 data segment. Thus, the number of data segments stored in the storage objects are respectively 2, 2, and 1, with differences of 0 or 1 that are both smaller than the first predefined threshold.

In conclusion, k+m data segments are equally stored into disks to the greatest extent. As such, in case of data loss due to failure of a disk or storage node, the lost data can be restored with data segments stored in other disks or storage nodes.

At S104, index information for the to-be-stored data is recorded, the index information including correspondence between each of data segments and the a storage object in which the data segments are stored.

In an example of predefined erasure coding strategy of 4+2, to-be-stored data is partitioned into 4 original segments, and 2 redundant segments are obtained through redundancy processing on the 4 original segments. These 6 data segments (4 original segments and 2 redundant segments) are, for example, A1, A2, A3, A4, A5, and A6. Assuming that 6 disks, B1, B2, B3, B4, B5, and B6, are assigned to the to-be-stored data as storage objects.

Embodiments are not limited in storage locations of the data segments on the disks. For example, segment A1 is stored on disk B1, A2 is stored on B2, A3 is stored on B3, A4 is stored on B4, A5 is stored on B5, and A6 is stored on B6. In this case, index information for the to-be-stored data may be recorded as: A1-B1, A2-B2, A3-B3, A4-B4, A5-B5, and A6-B6.

It is noted that, in the index information, original segments and redundant segments may be distinguishingly identified. The simple index information described above is provided by way of example. Embodiments are not limited in this aspect.

As described in the embodiment shown in FIG. 1 of the present application, segments of to-be-stored data are stored into storage objects. A storage object is a minimum unit for data storage. The difference between the number of data segments stored in a storage object and that of another storage object is no more than a first preset threshold. In other words, in the present embodiment, data segments are equally stored, to the greatest extent, into storage objects. The case that data having segments lost due to failure of a storage object cannot be restored is avoided.

Figure 2:
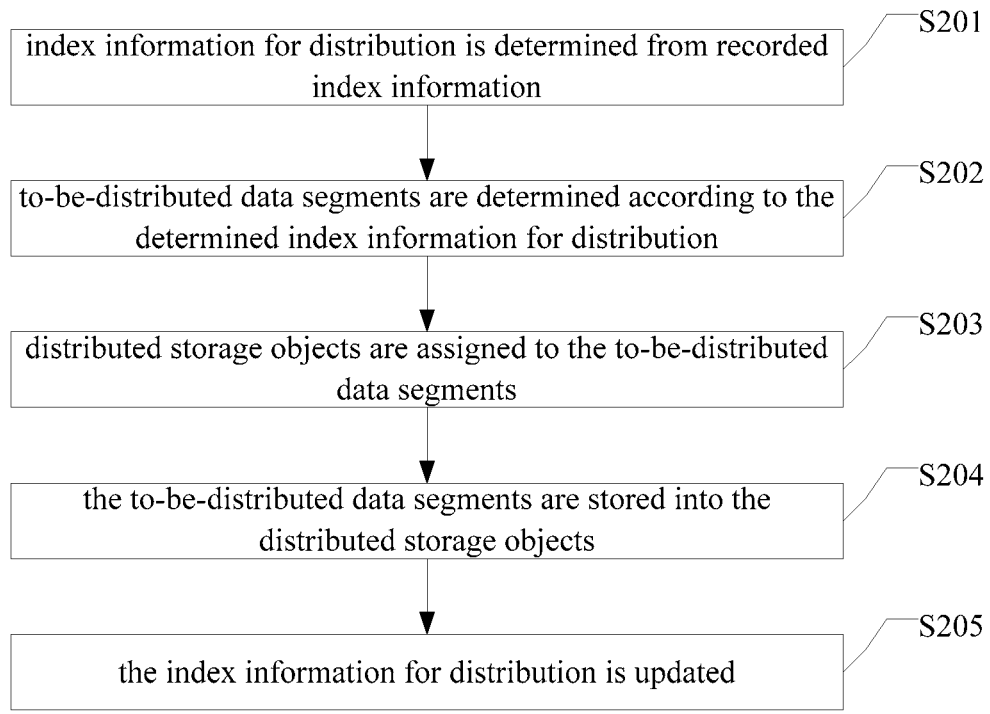
FIG. 2 is a flowchart of a method for data distribution according to an embodiment of the present application.

FIG. 2 is a flowchart of a method for data distribution according to an embodiment of the present application. The method includes the following operations.

At S201, index information for distribution is determined from recorded index information.

It is noted that, the data in the embodiment shown in FIG. 2 of the present application can be stored through the method for data storage described in the embodiment as shown in FIG. 1, or through another method for data storage. It can be seen from the description of the embodiment shown in FIG. 1 of the present application, during the process of data storage, index information of data is recorded. Therefore, index information for distribution can be determined from the recorded index information.

Index information may also be recorded in other storage methods. The index information comprises the correspondence between data segments and the storage objects in which they are stored. A storage object is a minimum unit for data storage.

Specifically, for each piece of index information, the record counts of storage objects associated with the piece of index information are determined. Index information having a target storage object the record count of which is greater than a third predefined threshold is determined as index information for distribution. The record count of a storage object associated with a piece of index information is the number of data segments stored thereon that are associated with the index information.

For example, a piece of index information is A1-B1, A2-B2, A3-B1, A4-B4, A5-B4, and A6-B6. Storage object B1 has 3 segments (A1, A2, and A3) stored thereon that are associated with the piece of index information. Storage object B1 is recorded for three times. In other words, the record count of storage object B1 is 3. The record count of storage object B4 is 2. The record count of storage object B6 is 1.

For example, the third predefined threshold is 2. A target storage object B1 has a record count greater than 2. In other words, 3 data segments associated with the index information are stored in the same storage object. The index information is then determined as index information for distribution.

It is appreciated that, data may not be able to be equally stored in most cases, and multiple segments of data may be stored in a single storage object. For example, when a system has its capacity enlarged, new storage nodes or disks are integrated into the system. This may lead to unequal data storage. In addition, unequal data storage may also occur when storage nodes are not sufficient.

The unequally stored data may be distributed through the approach in the present embodiment. Segments of data stored in one single storage object can be distributed. Specifically, to-be-distributed data segments can be determined according to the index information associated with the data. For example, index information having a target storage object the record count of which is greater than the third threshold can be determined as index information for distribution.

At S202, to-be-distributed data segments are determined according to the determined index information for distribution.

Specifically, to-be-distributed data segments can be determined from the data segments stored in the target storage object.

Continuing with the above-described example, the third predefined threshold is 2. A target storage object B1 has a record count greater than 2. To-be-distributed data segments are determined among the data segments stored in B1, i.e., A1, A2, and A3. For example, A2 and A3 are determined as to-be-distributed data segments.

At S203, distributed storage objects are assigned to the to-be-distributed data segments.

It is appreciated that, multiple segments of to-be-distributed data stored into a single storage object can be distributed to be stored into other storage objects. Therefore, new storage objects, referred to here as distributed storage objects, need to be assigned.

The principle of assigning distributed storage objects may be the same as the principle of assigning x storage objects to to-be-stored data in the embodiment shown in FIG. 1 of the present application:

if available storage nodes are sufficient, each to-be-distributed data segment is assigned with one available storage node;

if storage nodes are insufficient, but there are sufficient available disks, each to-be-distributed data segment is assigned with one available disk;

if available disks are also insufficient, then all the available disks are assigned to the to-be-distributed data segments.

In short, the data segments for distribution are equally distributed to the greatest extent to be stored into more storage objects. Data segments that are lost due to failure of a disk or storage node can be restored with data segments in other disks or nodes.

In one implementation, distributed storage objects can also be assigned based on resource utilization thereof. Specifically, priority can be given to storage objects with lower resource utilization rates.

The distributed storage objects may be assigned in various manners. Embodiments are not limited in this aspect.

At S204, the to-be-distributed data segments are stored into the distributed storage objects.

Assuming that available storage nodes are insufficient but available disks are sufficient, each of the to-be-distributed data segments is then assigned with an available disk.

Assuming that the distributed storage objects are disk B3 and disk B5. Embodiments are not limited in the storage location of the data segments. For example, A2 is stored into B3, and A3 is stored into B5.

At S205, the index information for distribution is updated.

Specifically, the index information for distribution can be updated base on the correspondence between the to-be-distributed data segments and the distributed storage objects in which they are stored.

The index information for distribution is updated to be: A1-B1, A2-B3, A3-B5, A4-B4, A5-B4, and A6-B6.

As described in the embodiment shown in FIG. 2 of the present application, the unequally stored data segments can be distributed so as to be more equally stored into the storage objects. A storage object is a minimum unit for data storage. The case that data having segments lost due to failure of a storage object cannot be restored is avoided, as the data is stored into multiple storage objects.

Figure 3:
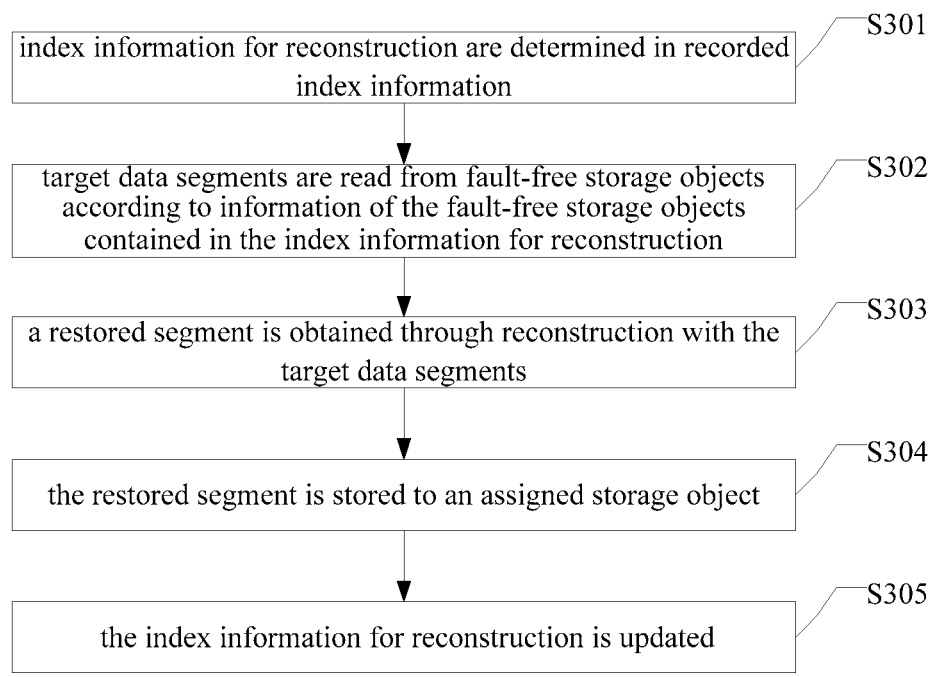
FIG. 3 is a flowchart of a method for data reconstruction according to an embodiment of the present application.

FIG. 3 is a flowchart of a method for data reconstruction according to embodiments of the present application. The method includes the following operations.

At S301, index information for reconstruction are determined in recorded index information. The index information for reconstruction comprises information of a fault storage object of failure. A storage object is a minimum unit for data storage.

It is noted that, data in the embodiment shown in FIG. 3 of the present application may be stored based on the method for data storage provided by the embodiment shown in FIG. 1 of the present application, or stored based on another method for storage. It can be seen from the description of the embodiment shown in FIG. 1 of the present application, during the process of data storage, index information of the data is recorded. Therefore, index information for reconstruction can be determined in the recorded index information.

Index information may also be recorded in other storing methods. The index information comprises the correspondence between data segments and the storage objects in which they are stored.

An electronic device to which the solution is applied can obtain information of fault storage objects. Thus, the electronic device can determine the index information associated with the fault storage objects as the index information for reconstruction.

For example, the electronic device can periodically detect whether a fault occurs on a storage node, disk, or smaller storage unit of the disk. Based on the description above, a storage object may be a minimum unit for storage of data segments. If a fault is detected on a storage object, the index information associated with that storage object is determined as the index information for reconstruction.

For example, storage objects C2 and C6 are subjected to faults. A piece of index information of A1-C1, A2-C2, A3-C3, A4-C4, A5-C5, and A6-C6 may be determined as the index information for reconstruction.

At S302, target data segments are read from fault-free storage objects according to information of the fault-free storage objects contained in the index information for reconstruction. The target data segments are data segments of the data to be reconstructed associated with the information for reconstruction.

Storage objects C1, C3, C4 and C5 associated with the index information above are free of fault. A1 is read from C1, A3 is read from C3, A4 is read from C4, and A5 is read from C5.

At S303, a restored segment is obtained through reconstruction with the target data segments.

New segments A2 and A6 are restored through reconstruction with segments A1, A3, A4, and A5 according to a predefined erasure coding strategy.

At S304, the restored segment is stored to an assigned storage object.

The new A2 and A6 are assigned with storage objects C7 and C8. For example, A2 is stored into C7, and A6 is stored into C8.

At S305, the index information for reconstruction is updated.

Specifically, the index information for reconstruction can be updated based on the correspondence between the restored segments and the storage objects in which the restored segments are stored.

The index information above is, after being updated, A1-C1, A2-C7, A3-C3, A4-C4, A5-C5, and A6-C8.

In the embodiment shown in FIG. 3 of the present application, data segments lost due to failure of a storage object can be reconstructed with data segments stored in fault-free storage objects, and is thus restored.

Figure 4:
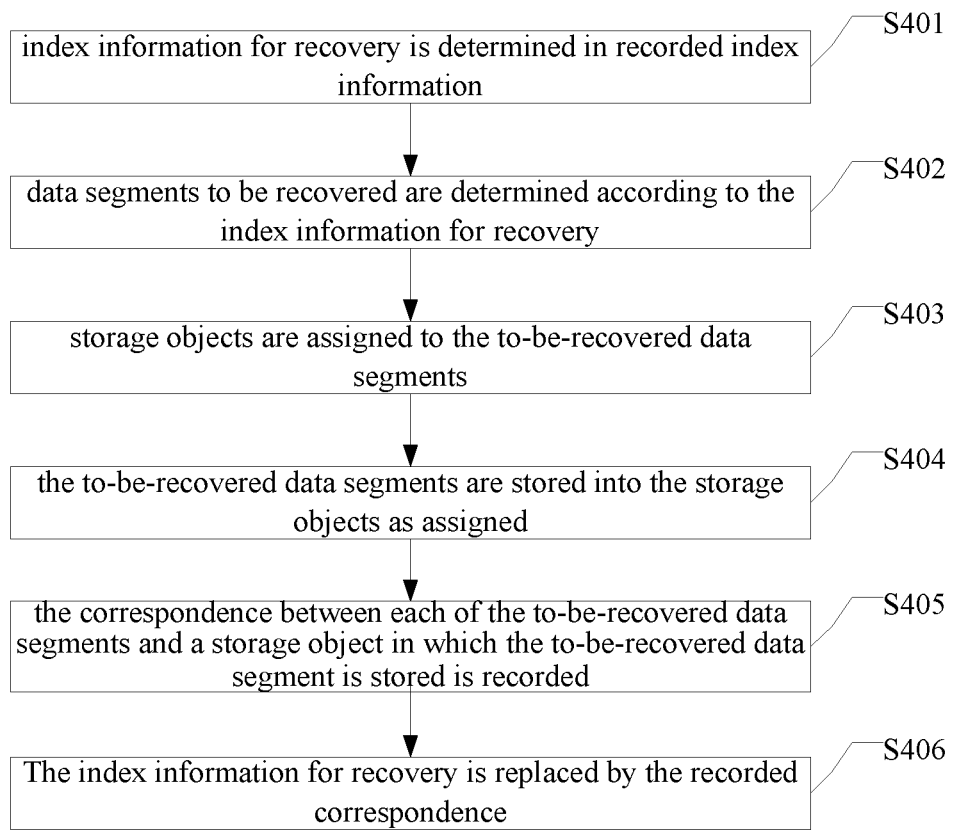
FIG. 4 is a flowchart of a method for data recovery according to an embodiment of the present application.

FIG. 4 is a schematic flowchart of a method for data recovery provided by embodiments of the present application. The method includes the following operations.

At S401, index information for recovery is determined in recorded index information.

It is noted that, data in the embodiment shown in FIG. 4 of the present application may be stored through the method for data storage provided by the embodiment shown in FIG. 1 of the present application. Data may also be stored through any other storage method. It can be seen from the description of the embodiment shown in FIG. 1 of the present application, during the process of data storage, index information of the data is recorded. Therefore, index information for recovery can be determined in the recorded index information.

Index information may also be recorded in another method for storage. Index information includes the correspondence between data segments and storage objects in which the data segments are stored. A storage object is a minimum unit for storing data.

Specifically, for each piece of recorded index item, determination is made as to whether associated invalid data segments are more than a fourth predefined threshold. The piece of index information is determined as the index information for recovery if the answer is yes. The invalid data segments are the data segments stored in fault storage objects.

For example, the piece of index information includes A1-B1, A2-B2, A3-B2, A4-B4, A5-B4, and A 6-B6, and faults occur on disks B2 and B6. The data segments A2, A3, and A6 stored in disks B2 and B6 are invalid data segments. The number of invalid data segments is 3.

Assuming that the fourth predefined threshold is 2, which is smaller than the number of invalid data segments. The piece of index information above is determined as index information for recovery.

At S402, data segments to be recovered are determined according to the index information for recovery.

Specifically, data segments to be recovered can be determined according to valid data segments associated with the index information for recovery. The valid data segments are the data segments other than the invalid data segments.

Continuing with the above-described example, data segments A1, A2, A3, A4, A5, and A6 are associated with the index information. Segments A2, A3, and A6 are invalid data segments. Remaining data segments A1, A4, and A5 are valid data segments. The valid data segments are determined as data segments to be recovered.

At S403, storage objects are assigned to the to-be-recovered data segments.

In one implementation, storage objects can be assigned based on resource utilization thereof. Specifically, in the assignment, priority can be given to storage objects with lower resource utilization rates.

At S404, the to-be-recovered data segments are stored into the storage objects as assigned.

Assuming that available storage nodes are insufficient, but there are sufficient available disks. Each of the to-be-recovered data segments is assigned with an available disk.

For example, disks B7, B8, and B9 are assigned to the data segments. The segments can be stored in the disks in various manners. Embodiment are not limited in this aspect. In an example, segment A1 is stored in B7, A4 is stored in B8, and A5 is stored in B9.

At S405, the correspondence between each of the to-be-recovered data segments and a storage object in which the to-be-recovered data segment is stored is recorded.

Correspondence of A1-B7, A4-B8, and A5-B9 is recorded.

At S406, new index information is generated according to the recorded correspondence to replace the index information for recovery.

New index information includes A1-B7, A4-B8, and A5-B9.

The number of data segments associated with a piece of the recorded index information may be fixed. For example, a piece of index information may be associated with 6 data segments. In this case, the piece of index information has to be fulfilled before being recovered. In addition, a piece of index information may be associated with data segments from different data.

Continuing with the above-described example, another piece of index information is A10-B10, A20-B20, A30-B30, A40-B40, A50-B40, and A60-B60. The disks B20 and B40 are fault disks. Then the data segments stored in B20 and B40 are invalid data segments. The number of invalid data segments is 3, and is greater than the fourth predefined threshold of 2. This index information is determined as the index information for recovery.

Data segments A10, A20, A30, A40, A50, and A60 are associated with the piece of index information. A20, A30, and A60 are invalid data segments, and the remaining data segments A10, A40, and A50 are valid data segments. The valid data segments are determined as to-be-recovered data segment. Thus, the two items of index information encompass 6 data segments to be recovered.

For example, the to-be-recovered data segments A10, A40, and A50 are assigned with disks B70, B80, and B90. A data segment may be stored in any of the disks. Embodiments are not limited in this aspect. For example, A10 is stored in B70, A40 is stored in B80, and A50 is stored in B90.

A10-B70, A40-B80, and A50-B90 are recorded as new index information to replace the index information of distribution. The two pieces of index information can be combined to be: A1-B7, A4-B8, A5-B9, A10-B70, A40-B80, and A50-B90. The two pieces of index information of distribution described above can be deleted. Only the new index information of A1-B7, A4-B8, A5-B9, A10-B70, A40-B80, and A50-B90 is retained.

As described in the embodiment shown in FIG. 4 of the present application, for a piece of index information associated with many invalid segments, valid segments associated the index information can be recovered. Storage resources can thus be saved.

In accordance with the above method embodiments, an apparatus for data storage, distribution, reconstruction, and recovery is provided.

Figure 5:
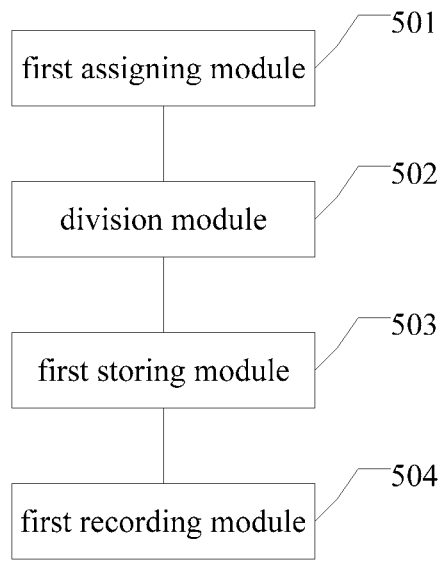
FIG. 5 is structural diagram of an apparatus for data storage according to an embodiment of the present application.

FIG. 5 is a schematic structural diagram of an apparatus for data storage provided by an embodiment of the present application. The apparatus comprises:

a first assigning module 501, configured for assigning x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;

a division module 502, configured for performing data division and redundancy processing to the to-be-stored data according to the erasure coding strategy of k+m, to obtain k+m data segments;

a first storing module 503, configured for storing the k+m data segments into x storage objects, wherein, the difference between the number of data segments stored in a storage object and that of another storage object is no more than a first preset threshold; and a first recording module 504, configured for recording index information for the to-be-stored data, the index information comprising correspondence between each of data segments and a storage object in which the data segment is stored.

In the embodiment, the first assigning module 501 may comprise a first decision sub-module and a first determining sub-module (not shown).

The first decision sub-module is configured for determining whether available storage nodes are fewer than k+m.

The first determining sub-module is configured for determining, if the available storage nodes are not fewer than k+m, x storage objects from the available storage nodes; wherein, each of the determined storage objects is from a different storage node, and x is equal to k+m.

The first storing module 503 may comprise:

a first storing sub-module (not shown), configured for storing each of the data segments into a storage object in a different storage node if the available storage nodes are not fewer than k+m.

In the embodiment, the first assigning module 501 may comprise a second decision sub-module and a second determining sub-module (not shown).

The second decision sub-module is configured for determining whether available storage objects of all the available storage nodes are fewer than k+m if the available storage nodes are fewer than k+m.

The second determining sub-module is configured for determining x storage objects from all the available storage nodes if the available storage objects of all the available storage nodes are not fewer than k+m; wherein, x is equal to k+m, and the difference between the number of data segments stored in a storage node and that of another storage node is no more than a second preset threshold.

The first storing module 503 may comprise:

a second storing sub-module (not shown), configured for storing each of the data segments into a different storage object if the available storage objects of all the available storage nodes are not fewer than k+m.

In the embodiment, the first assigning module 501 may comprise:

an assigning sub-module (not shown), configured for assigning all the available storage objects to the to-be-stored data if the available storage objects of all the available storage nodes are fewer than k+m; wherein x is equal to the number of all the available storage objects.

Further, the first storing module 503 may comprise:

a third storing sub-module (not shown), configured for equally dividing the k+m data segments into x parts and storing respectively the x parts of data into the x storage objects if the available storage objects of all the available storage nodes are fewer than k+m.

Figure 6:
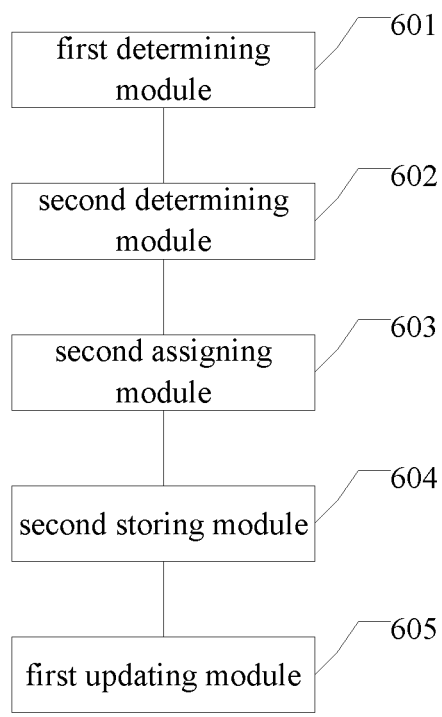
FIG. 6 is a structural diagram of an apparatus for data distribution according to an embodiment of the present application.

As described in the embodiment shown in FIG. 5 of the present application, segments of to-be-stored data are stored into storage objects. A storage object is a minimum unit for data storage. The difference between the number of data segments stored in a storage object and that of another storage object is no more than a first preset threshold. In other words, in the present embodiment, data segments are equally stored, to the greatest extent, into storage objects. The case that data having segments lost due to failure of a storage object cannot be restored is avoided FIG. 6 is a schematic structural diagram of an apparatus for data distribution according to an embodiment of the present application. The data in the embodiment shown in FIG. 6 may be stored by the apparatus for data storage provided by the embodiment shown in FIG. 5 of the present application, or by another storing devices. As shown in FIG. 6, the apparatus includes:

a first determining module 601, configured for determining index for distribution in recorded index information; wherein, the recorded index information comprises correspondence between each of data segments and a storage object in which the data segment is stored, and a storage object is a minimum unit for data storage;

a second determining module 602, configured for determining to-be-distributed data segments according to the determined index information for distribution;

a second assigning module 603, configured for assigning distributed storage objects to the to-be-distributed data segments;

a second storing module 604, configured for storing the to-be-distributed data segments into the distributed storage objects; and a first updating module 605, configured for updating the index information for distribution.

In the embodiment, the first determining module 601 may be further configured for:

for each piece of index information, determining record counts of storage objects associated with the piece of index information, wherein, a record count of a storage object associated with a piece of index information is the number of data segments stored in the storage object that are associated with the piece of index information; and determining a piece of index information having a target storage object whose record count is greater than a third predefined threshold as index information for distribution.

The second determining module 602 may be further configured for:

determining, among the data segments stored in the target storage object, the to-be-distributed data segments.

As described in the embodiment shown in FIG. 6 of the present application, the unequally stored data segments can be distributed so as to be more equally stored into the storage objects. A storage object is a minimum unit for data storage. The case that data having segments lost due to failure of a storage object cannot be restored is avoided, as the data is stored into multiple storage objects.

Figure 7:
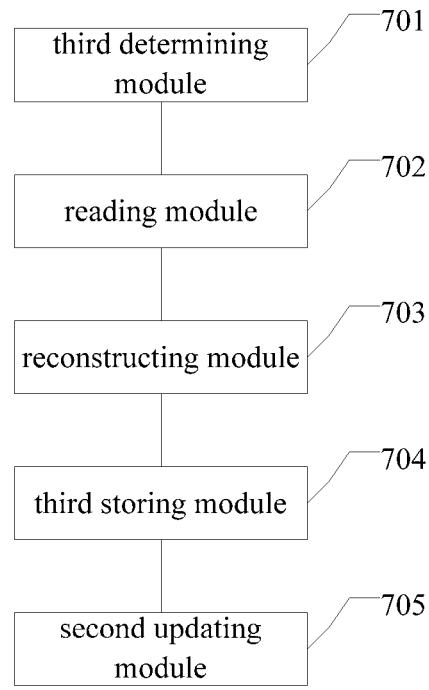
FIG. 7 is a structural diagram of an apparatus for data reconstruction according to an embodiment of the present application.

FIG. 7 is a schematic structural diagram of an apparatus for data reconstruction according to an embodiment of the present application. The data in the embodiment shown in FIG. 7 may be stored by the apparatus for data storage provided by the embodiment shown in FIG. 5 of the present application, or by any other storage apparatus. As shown in FIG. 7, the apparatus includes:

a third determining module 701, configured for determining index information for construction in recorded index information; wherein, the recorded index information comprises correspondence between each of data segments and a storage object in which the data segment is stored, the index information for reconstruction contains information of a fault storage object, and a storage object is a minimum unit for data storage;

a reading module 702, configured for reading, according to information of fault-free storage objects contained in the index information for reconstruction, target data segments from the fault-free storage objects, the target data segments being data segments of the data to be reconstructed associated with the information index for reconstruction;

a reconstructing module 703, configured for obtaining a restored segment through reconstruction with the target data segments;

a third storing module 704, configured for storing the restored segment into an assigned storage object; and a second updating module 705, configured for updating the index information for reconstruction.

In the embodiment shown in FIG. 7 of the present application, data segments lost due to failure of a storage object can be reconstructed with data segments stored in fault-free storage objects, and is thus restored.

Figure 8:
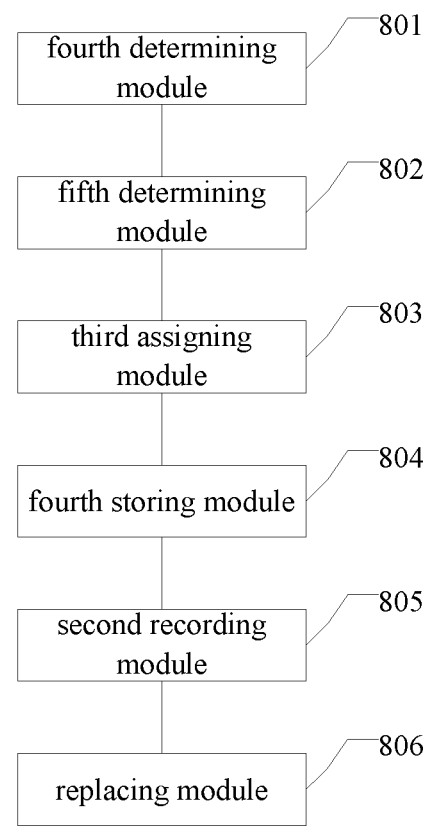
FIG. 8 is a structural diagram of an apparatus for data recovery according to an embodiment of the present application.

FIG. 8 is a schematic structural diagram of an apparatus for data recovery according to an embodiment of the present application. The data in the embodiment shown in FIG. 8 may be stored by the apparatus for data storage provided by the embodiment shown in FIG. 5 of the present application, or by any other storing devices. As shown in FIG. 8, the apparatus includes:

a fourth determining module 801, configured for determining index information for recovery in recorded index information; wherein, the recorded index information comprises correspondence between each of data segments and a storage object in which the data segment is stored, and a storage object is a minimum unit for data storage;

a fifth determining module 802, configured for determining to-be-recovered data segments according to the index information for recovery;

a third assigning module 803, configured for assigning storage objects to the to-be-recovered data segments;

a fourth storing module 804, configured for storing the to-be-recovered data segments into the assigned storage objects;

a second recording module 805, configured for recording correspondence between each of to-be-recovered data segments and a storage object in which the to-be-recovered data segment is stored; and a replacing module 806, configured for generating, according to the recorded correspondence, new index information to replace the index information for recovery.

In the embodiment, the fourth determining module 801 may be further configured for:

for each piece of recorded index information, determining whether invalid data segments associated with the piece of recorded index information are more than a fourth predefined threshold, if so, determining the piece of recorded index information as index information for recovery; wherein, the invalid data segments are data segments stored in fault storage objects.

In the embodiment, the fifth determining module 802 may be further configured for:

determining to-be-recovered data segments according to valid data segments associated with the index information for recovery, the valid data segments being data segments other than the invalid data segments.

As described in the embodiment shown in FIG. 8 of the present application, for a piece of index information associated with many invalid segments, valid segments associated the index information can be recovered. Storage resources can thus be saved.

Figure 9:
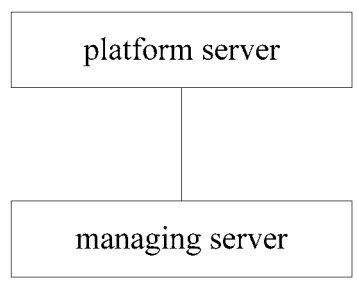
FIG. 9 is a first structural diagram of a data processing system according an embodiment of the present application.

Embodiments of the present application further provide a data processing system which, as shown in FIG. 9, includes a platform server and a managing server. The process of data storage by the system will be described in detailed in the following.

The platform server assigns x storage objects to to-be-stored data according to a predefined erasure coding strategy of k+m; wherein, k is the number of original segments, m is the number of redundant segments, x is greater than 1 and not greater than k+m, and a storage object is a minimum unit for data storage.

The managing server performs data division and redundancy processing to the to-be-stored data according to the erasure coding strategy of k+m, to obtain k+m data segments; and stores the k+m data segments into x storage objects, wherein, the difference between the number of data segments stored in a storage object and that of another storage object is no more than a first preset threshold.

The platform server records i index information for the to-be-stored data, the index information comprising correspondence between each of data segments and a storage object in which the data segment is stored.

In one implementation, the platform server may determine whether available storage nodes are fewer than k+m; and determine, if not fewer than k+m, x storage objects from the available storage nodes; wherein, each of the determined storage objects is from a different storage node, and x being equal to k+m. The platform may then store each of the data segments into a storage object in a different storage node.

In one implementation, if the available storage nodes are fewer than k+m, the platform server may determine if available storage objects of all the available storage nodes are fewer than k+m. If so, the platform server may determine x storage objects from all the available storage nodes; wherein, x is equal to k+m, and the difference between the number of data segments stored in a storage node and that of another storage node is no more than a second preset threshold. The platform server may store each of the data segments into a different storage object.

In one implementation, if the available storage objects of all the available storage nodes are fewer than k+m, the platform server may assign all the available storage objects to the to-be-stored data, wherein x is equal to the number of all the available storage objects; equally divide the k+m data segments into x parts; and store respectively the x parts of data into the x storage objects.

A specific implementation is described below:

1. After receiving a data storing request sent by a user, the platform server designates a managing server that receives to-be-stored data.

2. The designated managing server receives the to-be-stored data sent by the user.

3. The managing server applies for stripe resources to the platform server, and the platform server assigning a stripe resource for the to-be-stored data according to a predefined erasure coding strategy k+m:

for example, the predefined erasure coding strategy is 4+2, the platform server organizes the stripe resource of 4+1 to send down to the managing server.

Specifically, the platform server generates a unique stripe ID for each stripe. For example, when the platform server organizes the stripe resource of 4+1, the platform server assigns 5 storage objects (disks) to the stripe when the resource permits.

The rule of assigning 5 storage objects may include: if there are enough available storage nodes (the number is not smaller than 5), then 5 available storage nodes is assigned to store the to-be-stored data, so that each data segment of the to-be-stored data is stored to a different storage node.

If there is not enough number of available storage nodes (fewer than 5), but there is enough available disks (the number is not smaller than 5), then 5 available disks are assigned to store the to-be-stored data, so that each data segment of the to-be-stored data is stored to a different disk. It should be noted that, when assigning 5 available disks among all the available storage nodes, it should ensure that the various data segments are uniformly stored to the various storage nodes as much as possible.

If there is not enough number of available disks either (the number is smaller than 5), then all the available disks are assigned to store the to-be-stored data, so that each data segment of the to-be-stored data is, as much as possible, stored to a different disk.

Assume that the stripe assigned by the platform server for the to-be-stored data is:

{<stripe_id,OSD_1,wwn_1>,<stripe_id,OSD_2, wwn_2>,<stripe_id,OSD_3,wwn_3>,<stripe_id,OSD_4, wwn_4>,<stripe_id,OSD_5,wwn_5>}, wherein OSD can be understood as a storage node, OSD_1, OSD_2 and the like can be understood as identification information of a storage node, wwn can be understood as a disk, wwn_1, wwn_2 and the like can be understood as identification information of a disk.

4. The managing server performs slicing and redundancy processing on the to-be-stored data based on the stripe obtained by application (which can be also understood as the erasure coding strategy k+m,) obtaining original segments and redundant segments, and stores the original segments and redundant segments obtained respectively to the assigned storage objects.

Specifically, the managing server generates unique key information for each data segment in the stripe, such that each data segment in the stripe corresponds to a five-tuple <stripe_id, OSD, wwn, key, value>, wherein stripe_id represents the ID of the stripe, OSD represents the identification information of the storage node, wwn represents the identification information of the disk, key represents the key of the data segment, and value represents the value or content of the data segment.

The above stripe can be expressed integrally as:
{<stripe_id,OSD_1,wwn_1,key_1,value_1>,<stripe_id, OSD_2,wwn_2,key_2,value_2>,<stripe_id,OSD_3,wwn_3, key_3,value_3>,<stripe_id,OSD_4,wwn_4,key_4, value_4>,<stripe_id,OSD_5,wwn_5,key_5,value_5>}.

5. The managing server sends the data segments to the storage nodes to which they correspond according to the above complete stripe.

Specifically, the managing server may send a three-tuple <wwn, key, value> to the storage nodes, and the storage nodes store the data <key, value> to the corresponding disks according to the three-tuple, and return a message of successful storage to the storage nodes after the storage is completed.

6. After the managing server receives the message of successful storage sent by each storage node corresponding to the stripe (indicating that the to-be-stored data is successfully stored), the managing server will send <stripe_id, wwn, key> (that is, index information) of each data segment to the platform server.

7. After the platform server records the <stripe_id, wwn, key> (that is, the index information) of each data segment of the to-be-stored data, the storage of the to-be-stored data is completed.

It should be noted that, in some implementations, a same disk may belong to a different storage node at different times. Therefore, in this case, the stripe recorded by the platform server may not include the identification information of the storage node. In other words, the stripe recorded by the managing server can be: {<stripe_id, wwn_1, key_1>, <stripe_id, wwn_2, key_2>, <stripe_id, wwn_3, key_3>, <stripe_id, wwn_4, key_4>, <stripe_id, wwn_5, key_5>}.

In addition, the foregoing storage node may also be a storage server, or other components, which are not specifically limited.

The process of data reading by the data processing system will be described in details below.

The platform server determines index information for data to be read.

The managing server reads data segments of the data to be read from the storage objects according to the index information determined by the platform server; and combines the data segments as read so as to obtain the data to be read.

A specific implementation is described below:

1. The platform server receives a data read request sent by a user, determines the data to be read according to the data read request, and designates a managing server that performs the read operation.

2. The designated managing server requests the platform server for the stripe information of the data to be read (that is, the index information corresponding to the data to be read).

Assume that the erasure coding strategy corresponding to the data to be read is 4+1, and the stripes of the data to be read recorded in the platform server are:
{<stripe_id,wwn_1,key_1>,<stripe_id,wwn_2,key_2>, <stripe_id,wwn_3,key_3>,<stripe_id,wwn_4,key_4>,<stripe_id,wwn_5,key_5>}.

According to the above description, a same disk may belong to a different storage nodes at different times. In this case, the stripe information recorded by the platform server does not include the identification information of the storage node. Therefore, the platform server needs to obtain the identification information of the corresponding storage node according to the identification information of the disk, and fills the above-mentioned stripes with the obtained identification information of the storage node. The stripe after filling are:
{<stripe_id, OSD_1, wwn_1, <stripe_id, OSD_2, wwn_2, key_2>, <stripe_id, OSD_3, wwn_3, key_3>, <stripe_id, OSD_4, wwn_4, key_4>, <stripe_id, OSD_5, wwn_5, key_5>};

3. The managing server may send a two-tuple <wwn, key> to the storage nodes according to the above-mentioned stripes after filling, and the storage nodes read the value on the wwn (disk) according to the two-tuple, and the storage nodes send the <key, value> that they read the managing server.

4. The managing server combines the <key, value> of each data segment sent by storage nodes, and the combined stripe is:
{<key_1, value_1>, <key_2, value_2>, <key_3, value_3>, <key_4, value_4>, <key_5, value_5>}, so that the data to be read is obtained.

5. The managing server sends the data to be read to the user.

In addition, the foregoing storage node may also be a storage server, or other components, which are not specifically limited.

The process of data distribution by the data processing system will be described in details below.

The platform server may determine index information for distribution in recorded index information.

The managing server may determine to-be-distributed data segments according to the determined index information for distribution; assigns distributed storage objects to the to-be-distributed data segments; and stores the to-be-distributed data segments into the distributed storage objects.

The platform server may update the index information for distribution.

Specifically, the platform server may determine, for each piece of index information, record counts of storage objects associated with the piece of index information, wherein, a record count of a storage object associated with a piece of index information is the number of data segments stored in the storage object that are associated with the piece of index information; and determine a piece of index information having a target storage object whose record count is greater than a third predefined threshold as index information for distribution.

The managing server may determine, among the data segments stored in the target storage object, the to-be-distributed data segments.

Figure 10:
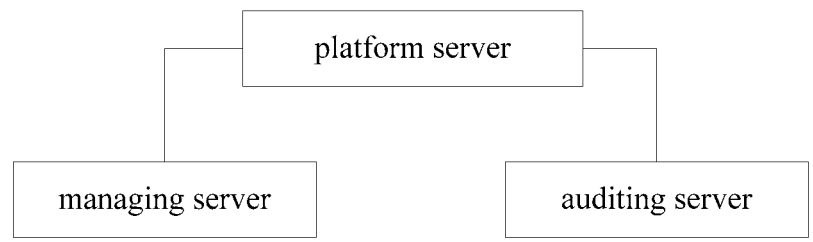
FIG. 10 is a second structural diagram of a data processing system according an embodiment of the present application.

In another implementation, as shown in FIG. 10, the data processing system may further include an auditing server.

The platform server may determine index information for distribution in recorded index information.

The auditing server may determine to-be-distributed data segments according to the determined index information for distribution; assigns distributed storage objects to the to-be-distributed data segments; and stores the to-be-distributed data segments into the distributed storage objects.

The platform server may update the index information for distribution.

Specifically, the platform server may determine, for each piece of index information, record counts of storage objects associated with the piece of index information; and determine a piece of index information having a target storage object whose record count is greater than a third predefined threshold as index information for distribution.

The auditing server may determine, among the data segments stored in the target storage object, the to-be-distributed data segments.

A specific implementation is described below with reference to FIG. 10:

1. the platform server scans recorded stripes (that is, the index information corresponding to each data segment), and determines the number of recording of each storage object to which each stripe corresponds, when a target storage object exists with a number of recording exceeding a third predefined threshold, determines that stripe is the stripe for distribution.

Assume that the determined stripes for distribution are:

{<stripe_id,wwn_1,key_1>,<stripe_id,wwn_1,key_2>, <stripe_id,wwn_3,key_3>,<stripe_id,wwn_4,key_4>,<stripe_id,wwn_5,key_5>} (wherein wwn_1 has 2 recordings, assuming that the third predefined threshold is 1, since there is a target storage object with the number of recording exceeds the third predefined threshold, this stripe is determined as the stripe for distribution.)

According to the above description, a same disk may belong to a different storage nodes at different times. In this case, the stripe information recorded by the platform server does not include the identification information of the storage node. Therefore, the platform server needs to obtain the identification information of the corresponding storage node according to the identification information of the disk, and fills the above-mentioned stripes with the obtained identification information of the storage node. The stripes after filling are:

{<stripe_id,OSD_1,wwn_1,key_1>,<stripe_id,OSD_1, wwn_1,key_2>,<stripe_id, OSD_3,wwn_3,key_3>,<stripe_id,OSD_3,wwn_4,key_4>,<stripe_id,OSD_5,wwn_5, key_5>}.

The platform server sends the stripes after filling (that is, the index information for distribution) to the auditing server.

2. The auditing server receives the stripes.

3. The auditing server analyzes the stripes and determines the data segments to be distributed:

Specifically, <key1, key2> is stored on a disk wwn_1, and <key1, key2>, <key3, key4> are stored on a storage node OSD_1, and key_1 and key_3 can be determined as the data segments to be distributed. That is to say, when multiple data segments of the same data are stored in the same disk or the same storage node, the data segments to be distributed may be determined among the multiple data segments.

The auditing server sends <wwn_1, key_1>, <wwn_3, key_3> to the corresponding storage nodes to read the data.

4. The auditing server requests the platform server for the storage nodes for distribution, and the disks <OSD_x, wwn_x>, <OSD_y, wwn_y> (that is, assigning the distributed storage objects for the data segments to be distributed).

5. The auditing server writes the read data <OSD_1, wwn_1, key_1, value_1>, <OSD_3, wwn_3, key_3, value_3> to new storage nodes and the disks, and the data segments after writing can be represented as a three-tuple:

<OSD_x, wwn_x, key_1, value_1>, <OSD_y, wwn_y, key_3, value_3>.

6. The three-tuple of the data segments recorded before the distribution is: <OSD_1, wwn_1, key_1, value_1>, <OSD_3, wwn_3, key_3, value_3>.

7. The auditing server notifies the platform server that the distributing operation has been completed, and the platform server modifies the stripes to: {<stripe_id, wwn_x, key_1>, <stripe_id, wwn_1, key_2>, <stripe_id, wwn_y, key_3>, <stripe_id, wwn_4, Key_4>, <stripe_id, wwn_5, key_5>}.

That is updating the index information for distribution.

In addition, the foregoing storage node may also be a storage server, or other components, which are not specifically limited.

As described in the above embodiment, the unequally stored data segments can be distributed so as to be more equally stored into the storage objects. A storage object is a minimum unit for data storage. The case that data having segments lost due to failure of a storage object cannot be restored is avoided, as the data is stored into multiple storage objects.

The process of data reconstruction by the data processing system will be described in details below.

The platform server may determine index information for construction in recorded index information; wherein, the index information for reconstruction contains information of a fault storage object.

The managing server may read, according to information of fault-free storage objects contained in the index information for reconstruction, target data segments from the fault-free storage objects, the target data segments being data segments of the data to be reconstructed associated with the information index for reconstruction; obtains a restored segment through reconstruction with the target data segments; and stores the restored segment into an assigned storage object.

The platform server may update the index information for reconstruction.

In another implementation, as shown in FIG. 10, the data processing system may further include an auditing server, The platform server may determine index information for construction in recorded index information; wherein, the index information for reconstruction contains information of a fault storage object.

The auditing server may read, according to information of fault-free storage objects contained in the index information for reconstruction, target data segments from the fault-free storage objects, the target data segments being data segments of the data to be reconstructed associated with the information index for reconstruction; obtains a restored segment through reconstruction with the target data segments; and stores the restored segment into an assigned storage object.

The platform server may update the index information for reconstruction.

When a storage node malfunctions or a disk malfunctions, the data processing system will initiate data reconstructing. A specific implementation is described below with respect to FIG. 10:

1. The platform server obtains information of a storage node or a disk that malfunctions; scans recorded stripes (that is, index information corresponding to each data segment); and determines the stripes containing information of the storage node or the disk malfunctions as the stripes to be reconstructed (i.e., determining the index information for reconstruction); designates an auditing server that performs the reconstructing operation.

Assume that the determined stripes to be reconstructed are:

{<stripe_id,wwn_1,key_1>,<stripe_id,wwn_2,key_2>, <stripe_id,wwn_3,key_3>,<stripe_id,wwn_4,key_4>,<stripe_id,wwn_5,key_5>}, where the disk wwn 1 goes offline;

according to the above descriptions, a same disk may belong to a different storage nodes at different times. In this case, the stripe information recorded by the platform server does not include the identification information of the storage node. Therefore, the platform server needs to obtain the identification information of the corresponding storage node according to the identification information of the disk, and fills the above-mentioned stripes with the obtained identification information of the storage node. The stripes after filling are:

{<stripe_id, OSD_1, wwn_1, key_1>, <stripe_id, OSD_2, wwn_2, key_2>, <stripe_id, OSD_3, wwn_3, key_3>, <stripe_id, OSD_4, wwn_4, key_4>, <stripe_id, OSD_5, wwn_5, key_5>}.

The platform server sends the stripes after filling and the data segments that need to be reconstructed <stripe_id, OSD_1, wwn_1, key_1> (that is, the index information to be repaired) to the auditing server.

2. After receiving the above-mentioned stripes after filling and the data segments that need to be repaired, the auditing server classifies the information in the stripes:

The data segments corresponding to the four items of index information {<stripe_id, OSD_2, wwn_2, key_2>, <stripe_id, OSD_3, wwn_3, key_3>, <stripe_id, OSD_4, wwn_4, key_4>, <stripe_id, OSD_5, wwn_5, key_5>} are not lost, and can be read normally; the data segment corresponding to the index information <stripe_id, OSD_1, wwn_1, key_1> is lost, and it needs to be repaired by using the erasure coding strategy.

3. The auditing server sends {<wwn_2, key_2>, <wwn_3, key_3>, <wwn_4, key_4>, <wwn_5, key_5>} to the corresponding storage nodes to read the data.

4. After reading the data, the stripes are:

{<wwn_2,key_2,value_2>,<wwn_3,key_3,value_3>, <wwn_4,key_4,value_4>,<wwn_5,key_5,value_5>}, and the erasure coding strategy is used to repair the lost data segment Value_1 in the disk wwn_1.

5. The auditing server requests the platform server for a new storage node and disk <OSD_z, wwn_z>.

6. The auditing server writes the restored data segment value_1 to the new storage node and the disk <OSD_z, wwn_z>.

7. After the reconstructing operation is completed, the auditing server notifies the platform server to update the stripes; at this time, the platform server updates the stripes to:

{<stripe_id,wwn_z,key_1>,<stripe_id,wwn_2,key_2>, <stripe_id,wwn_3,key_3>,<stripe_id,wwn_4,key_4>,<stripe_id,wwn_5,key_5>}.

In addition, the foregoing storage node may also be a storage server, or other components, which are not specifically limited.

The process of data recovery by the data processing system will be described in details below.

The platform server determines index information for recovery in recorded index information.

The managing server determines to-be-recovered data segments according to the index information for recovery.

The platform server assigns storage objects to the to-be-recovered data segments.

The managing server stores the to-be-recovered data segments into the assigned storage objects.

The platform server records correspondence between each of to-be-recovered data segments and a storage object in which the to-be-recovered data segment is stored; and generates, according to the recorded correspondence, new index information to replace the index information for recovery.

In another implementation, as shown in FIG. 10, the data processing system may further include an auditing server.

The platform server determines index information for recovery in recorded index information.

The auditing server determines to-be-recovered data segments according to the index information for recovery.

The platform server assigns storage objects to the to-be-recovered data segments.

The auditing server stores the to-be-recovered data segments into the assigned storage objects.

The platform server records correspondence between each of to-be-recovered data segments and a storage object in which the to-be-recovered data segment is stored; and generates, according to the recorded correspondence, new index information to replace the index information for recovery.

Specifically, the platform server may determine, for each piece of recorded index information, whether invalid data segments associated with the piece of recorded index information are more than a fourth predefined threshold, if so, determining the piece of recorded index information as index information for recovery; wherein, the invalid data segments are data segments stored in fault storage objects.

The managing server may determine to-be-recovered data segments according to valid data segments associated with the index information for recovery, the valid data segments being data segments other than the invalid data segments.

A specific implementation is described below with respect to FIG. 10:

1. The platform server scans the recorded stripes (that is, the index information corresponding to each data segment), and determines the stripe to be recovered:

Assume that the fourth predefined threshold is 2, the number of the invalid data segments (represented by NULL) contained in the following five stripes is 4, so the five stripes are determined as the stripes to be restored:

{<stripe_id_1,wwn_11,key_11>,NULL,NULL,NULL, NULL},

{<stripe_id_2,wwn_21,key_21>,NULL,NULL,NULL, NULL},

{<stripe_id_3,wwn_31,key_31>,NULL,NULL,NULL, NULL},

{<stripe_id_4,wwn_41,key_41>,NULL,NULL,NULL, NULL},

{<stripe_id_5, wwn_51, key_51>, NULL, NULL, NULL, NULL}.

According to the above descriptions, a same disk may belong to a different storage nodes at different times. In this case, the stripe information recorded by the platform server does not include the identification information of the storage node. Therefore, the platform server needs to obtain the identification information of the corresponding storage node according to the identification information of the disk, and fills the above-mentioned stripes with the obtained identification information of the storage node. The stripes after filling are:

{<stripe_id_1, OSD_11, wwn_11, key_11>, NULL, NULL, NULL, NULL},

{<stripe_id_2, OSD_21, wwn_21, key_21>, NULL, NULL, NULL, NULL},

{<stripe_id_3, OSD_31, wwn_31, key_31>, NULL, NULL, NULL, NULL},

{<stripe_id_4, OSD_41, wwn_41, key_41>, NULL, NULL, NULL, NULL},

{<stripe_id_5, OSD_51, wwn_51, key_51>, NULL, NULL, NULL, NULL}.

The platform server sends the stripes after filling to the auditing server.

2. The auditing server receives the above five to-be-reconstructed strips.

3. The auditing server determines the data segments to be recovered according to the received five stripes. That is, the data segments other than the invalid data segments (represented by NULL) in the stripes are determined as the data segments to be recovered.

The auditing server sends the valid data segment <wwn_11, key_11> in the stripe_id_1 to the storage node OSD_11 to read the data value11; sends the valid data segment <wwn_21, key_21> in the stripe_id_2 to the storage node OSD_21 to read the data value21; sends the valid data segment <wwn_31, key_31> in the stripe_id_3 to the storage node OSD_31 to read the data value31; sends the valid data segment <wwn_41, key_41> in the stripe_id_4 to the storage node OSD_41 to read the data value41; sends the valid data segment <bwn_51, Key_51> in the stripe_id_5 to the storage node OSD_51 to read the data value51.

4. The auditing server request the platform server for an idle stripe, assuming that the stripe requested are:
{<stripe_id, OSD_1, wwn_1>, <stripe_id, OSD_2, wwn_2>, <stripe_id, OSD_3, wwn_3>, <stripe_id, OSD_4, wwn_4>, <stripe_id, OSD_5, wwn_5>}.

5. The auditing server organizes the read data according to the new stripes and the new stripes after organization are:
{<stripe_id, OSD_1, wwn_1, key_11, value_11>, <stripe_id, OSD_2, wwn_2, key_21, value_21>, <stripe_id, OSD_3, wwn_3, key_31, value_31>, <stripe_id, OSD_4, wwn_4, key_41, value_41>, <Stripe_id, OSD_5, wwn_5, key_51, value_51>}.

6. The auditing server sends the data segments to their corresponding storage nodes according to the above new stripes.

Specifically, the auditing server may send a three-tuple <wwn, key, value> to the storage nodes, and the storage nodes store the data <key, value> to the corresponding disk according to the three-tuple, and return a message of successful storage to the storage nodes after the storage is completed.

7. Upon completion of retrieving, the auditing server notifies the platform server to send the above new stripes to the platform server for storage. That is, the platform server records the corresponding relationship between each data segment to be recovered and the storage object storing the data segment to be recovered; and generates new index information based on the recorded corresponding relationship to replace the index information for recovery.

It should be noted that, in some implementation, a same disk may belong to a different storage node at different times. Therefore, in this case, the stripe recorded by the platform server may not include the identification information of the storage node. In other words, the stripes recorded by the managing server can be:
{<stripe_id, wwn_1, key_11>, <stripe_id, wwn_2, key_21>, <stripe_id, wwn_3, key_31>, <stripe_id, wwn_4, key_41>, <stripe_id, wwn_5, key_51>}.

8. The platform server deletes the above five stripes to be recovered.

It can be understood that some storage nodes or disks malfunctions after the system operates for a long time, or other conditions may cause some data in the stripes to be invalid, and invalid data still occupies stripe resources, which may cause waste of stripe resources. By applying the present solution, when the number of invalid data segments in the stripe is large, the valid segments in the stripe can be recovered, thus saving the stripe resources.

As an implementation, the platform server may execute the present solution every predefined period, and retrieve the valid segments in a stripe timely to save strip resources.

In addition, the foregoing storage node may also be a storage server, or other components, which are not specifically limited.

Figure 11:
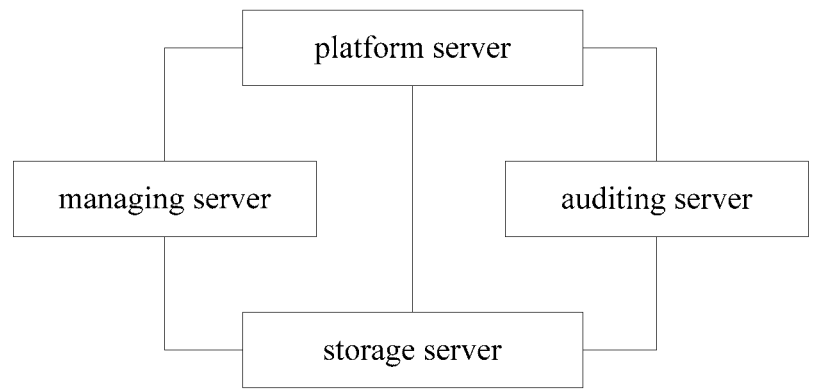
FIG. 11 is a third structural diagram of a data processing system according an embodiment of the present application.

It is noted that the data processing system provided by an embodiment of the present application can further comprise a storage server, as shown in FIG. 11.

In an implementation, the storage server may comprise the above-mentioned storage nodes, or the storage server may be an storage node.

The storage server reports operating status information of the storage objects to the platform server, so that the platform server assigns storage objects to to-be-stored data, assigns distributed storage objects to the to-be-distributed data segments, and determines index information for reconstruction, based on the operating status information reported by the storage server.

Figure 12:
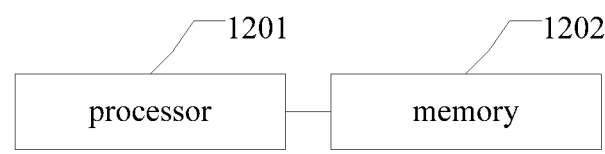
FIG. 12 is a structural diagram of an electronic device according to an embodiment of the present application.

Embodiments of the present application further disclose an electronic device, as shown in FIG. 12, comprising a processor 1201 and a memory 1202, wherein, the memory 1202 is configured for storing executable program codes, and the processor 1201 may read and execute the executable program codes stored in the memory 1202, so as to perform any of the methods for data storage, distribution, reconstruction, and recovery described above.

Embodiments of the present application further disclose executable program codes which, when being executed, perform any above-described methods for data storage, distribution, reconstruction, and recovery.

Embodiments of the present application further discloses a computer readable storage medium having executable program codes stored therein which, when being executed, perform any above-described methods for data storage, distribution, reconstruction, and recovery.

It should be noted that the relationship terms herein such as "first", "second", and the like arc only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the wording "comprise(s) a" or "include(s) a" do not exclude that there are other identical elements in the processes, methods, articles, or devices which include these elements.

All of the embodiments in the description are described in a correlated manner, and various embodiments may share identical or similar parts. The description for each embodiment focuses on the differences from other embodiments. In particular, a brief description is provided to embodiment of the apparatus for data storage shown in FIG. 5, in view of the resemblance to embodiment of the method for data storage shown in FIG. 1. Relevant details can be known with reference to the description of the embodiments of the method for data storage shown in FIG. 1. A brief description is provided to embodiment of the apparatus for data distribution shown in FIG. 6, in view of the resemblance to embodiment of the method for data distribution shown in FIG. 2. Relevant details can be known with reference to the description of the embodiments of the method for data distribution shown in FIG. 2. A brief description is provided to embodiment of the apparatus for data reconstruction shown in FIG. 7, in view of the resemblance to embodiment of the method for data reconstruction shown in FIG. 3.

Relevant details can be known with reference to the description of the embodiments of the method for data reconstruction shown in FIG. 3. A brief description is provided to embodiment of the apparatus for data recovery shown in FIG. 8, in view of the resemblance to embodiment of the method for data recovery shown in FIG. 4. Relevant details can be known with reference to the description of the embodiments of the method for data recovery shown in FIG. 4. A brief description is provided to embodiments of the data processing system shown in FIGS. 9-11, in view of their resemblance to embodiments of the method for data storage, distribution, reconstruction and recovery as shown in FIGS. 1-4. Relevant details can be known with reference to the description of the method embodiments shown in FIGS. 1-4.

One of ordinary skills in the art can understand that all or part of the steps can be implemented by a hardware operating under program instructions. The instruction may be stored in a computer readable storage medium, such as ROM/RAM, disk, CD, etc.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for data storage, comprising:
   assigning x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;
   performing data division and redundancy processing to the to-be-stored data according to the erasure coding strategy of k+m, to obtain k+m data segments;
   storing the k+m data segments into the x storage objects, wherein, the difference between the number of data segments stored in a storage object and that of another storage object is no more than a first preset threshold;
   recording index information for the to-be-stored data, the index information comprising correspondence between each of data segments and a storage object in which the data segment is stored;
   for each piece of the recorded index information, determining whether invalid data segments associated with the piece of recorded index information are more than a fourth predefined threshold, if so, determining the piece of recorded index information as index information for recovery; wherein, the invalid data segments are data segments stored in fault storage objects;
   determining valid data segments associated with the index information for recovery as to-be-recovered data segments, the valid data segments being data segments in the index information for recovery that correspond to fault-free storage objects;
   assigning storage objects to the to-be-recovered data segments; and
   storing the to-be-recovered data segments into the assigned storage objects.

2. The method according to claim 1, wherein, assigning x storage objects to to-be-stored data according to a predefined erasure coding strategy of k+m comprises:
   determining whether available storage nodes are fewer than k+m;
   if not fewer than k+m, determining x storage objects from the available storage nodes; wherein, each of the determined storage objects is from a different storage node, and x is equal to k+m;
   storing the k+m data segments into x storage objects comprises:
   storing each of the data segments into a storage object in a different storage node.

3. The method according to claim 2, wherein, if the available storage nodes are fewer than k+m, the method further comprises:
   determining whether available storage objects of all the available storage nodes are fewer than k+m;
   if not fewer than k+m, determining x storage objects from all the available storage nodes; wherein, x is equal to k+m, and the difference between the number of data segments stored in a storage node and that of another storage node is no more than a second preset threshold;
   storing the k+m data segments into x storage objects comprises:
   storing each of the data segments into a different storage object.

4. The method according to claim 3, wherein, if the available storage objects of all the available storage nodes are fewer than k+m, the method further comprises:
   assigning all the available storage objects to the to-be-stored data; wherein x is equal to the number of all the available storage objects;
   storing the k+m data segments into x storage objects comprises:
   equally dividing the k+m data segments into x parts, and storing respectively the x parts of data into the x storage objects.

5. The method of claim 1, further comprising:
   for each piece of the recorded index information, determining record counts of storage objects associated with the piece of index information, wherein, a record count of a storage object associated with a piece of index information is the number of data segments stored in the storage object that are associated with the piece of index information;
   determining a piece of index information having a target storage object whose record count is greater than a third predefined threshold as index information for distribution;
   determining, among the data segments stored in the target storage object, to-be-distributed data segments;
   assigning distributed storage objects to the to-be-distributed data segments; and
   storing the to-be-distributed data segments into the distributed storage objects.

6. The method of claim 1, further comprising:
   determining index information for construction in the recorded index information; wherein, the index information for reconstruction contains information of a fault storage object;
   reading, according to information of fault-free storage objects contained in the index information for reconstruction, target data segments from the fault-free storage objects, the target data segments being data segments of the data to be reconstructed associated with the information index for reconstruction;
   obtaining a restored segment through reconstruction with the target data segments; and
   storing the restored segment into an assigned storage object.

7. An apparatus for data storage, comprising:
a first assigning module, configured for assigning x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;
a division module, configured for performing data division and redundancy processing to the to-be-stored data according to the erasure coding strategy of k+m, to obtain k+m data segments;
a first storing module, configured for storing the k+m data segments into the x storage objects, wherein, the difference between the number of data segments stored in a storage object and that of another storage object is no more than a first preset threshold;
a first recording module, configured for recording index information for the to-be-stored data, the index information comprising correspondence between each of data segments and a storage object in which the data segment is stored;
a fourth determining module, configured for, for each piece of the recorded index information, determining whether invalid data segments associated with the piece of recorded index information are more than a fourth predefined threshold, if so, determining the piece of recorded index information as index information for recovery; wherein, the invalid data segments are data segments stored in fault storage objects;
a fifth determining module, configured for determining valid data segments associated with the index information for recovery as to-be-recovered data segments, the valid data segments being data segments in the index information for recovery that correspond to fault-free storage objects;
a third assigning module, configured for assigning storage objects to the to-be-recovered data segments; and
a fourth storing module, configured for storing the to-be-recovered data segments into the assigned storage objects.

8. The apparatus according to claim 7, wherein, the first assigning module comprises:
a first decision sub-module, configured for determining whether available storage nodes are fewer than k+m; and
a first determining sub-module, configured for determining, if the available storage nodes are not fewer than k+m, x storage objects from the available storage nodes; wherein, each of the determined storage objects is from a different storage node, and x is equal to k+m; and
the first storing module comprises:
a first storing sub-module, configured for storing each of the data segments into a storage object in a different storage node if the available storage nodes are not fewer than k+m.

9. The apparatus according to claim 8, wherein, the first assigning module comprises:
a second decision sub-module, configured for determining whether available storage objects of all the available storage nodes are fewer than k+m if the available storage nodes are fewer than k+m; and
a second determining sub-module, configured for determining x storage objects from all the available storage nodes if the available storage objects of all the available storage nodes are not fewer than k+m; wherein, x is equal to k+m, and the difference between the number of data segments stored in a storage node and that of another storage node is no more than a second preset threshold; and
the first storing module comprises:
a second storing sub-module, configured for storing each of the data segments into a different storage object if the available storage objects of all the available storage nodes are not fewer than k+m.

10. The apparatus according to claim 9, wherein, the first assigning module comprises:
an assigning sub-module, configured for assigning all the available storage objects to the to-be-stored data if the available storage objects of all the available storage nodes are fewer than k+m; wherein x is equal to the number of all the available storage objects; and
the first storing module comprises:
a third storing sub-module, configured for equally dividing the k+m data segments into x parts and storing respectively the x parts of data into the x storage objects if the available storage objects of all the available storage nodes are fewer than k+m.

11. The apparatus of claim 7, further comprising:
a first determining module, configured for, for each piece of the recorded index information, determining record counts of storage objects associated with the piece of index information, wherein, a record count of a storage object associated with a piece of index information is the number of data segments stored in the storage object that are associated with the piece of index information; and determining, among the data segments stored in the target storage object, to-be-distributed data segments;
a second determining module, configured for determining, among the data segments stored in the target storage object, to-be-distributed data segments;
a second assigning module, configured for assigning distributed storage objects to the to-be-distributed data segments; and
a second storing module, configured for storing the to-be-distributed data segments into the distributed storage objects.

12. The apparatus of claim 7, further comprising:
a third determining module, configured for determining index information for construction in recorded index information; wherein, the index information for reconstruction contains information of a fault storage object;
a reading module, configured for reading, according to information of fault-free storage objects contained in the index information for reconstruction, target data segments from the fault-free storage objects, the target data segments being data segments of the data to be reconstructed associated with the information index for reconstruction;
a reconstructing module, configured for obtaining a restored segment through reconstruction with the target data segments; and
a third storing module, configured for storing the restored segment into an assigned storage object.

13. A data processing system, comprising a platform server and a managing server, wherein,
the platform server assigns x storage objects to to-be-stored data according to a predefined erasure coding strategy of k+m; wherein, k is the number of original segments, m is the number of redundant segments, x is greater than 1 and not greater than k+m, and a storage object is a minimum unit for data storage;

the managing server performs data division and redundancy processing to the to-be-stored data according to the erasure coding strategy of k+m, to obtain k+m data segments; and stores the k+m data segments into x storage objects, wherein, the difference between the number of data segments stored in a storage object and that of another storage object is no more than a first preset threshold;

the platform server records index information for the to-be-stored data, the index information comprising correspondence between each of data segments and a storage object in which the data segment is stored;

the platform server determines, for each piece of the recorded index information, whether invalid data segments associated with the piece of recorded index information are more than a fourth predefined threshold, if so, determining the piece of recorded index information as index information for recovery; wherein, the invalid data segments are data segments stored in fault storage objects the managing server determines valid data segments associated with the index information for recovery as to-be-recovered data segments, the valid data segments being data segments in the index information for recovery that correspond to fault-free storage objects;

the platform server assigns storage objects to the to-be-recovered data segments;

the managing server stores the to-be-recovered data segments into the assigned storage objects.

14. The system according to claim 13, wherein,
the platform server determines index information of data to be read; and
the managing server reads data segments of the data to be read from the storage objects according to the index information determined by the platform server; and combines the data segments as read so as to obtain the data to be read.

15. The system according to claim 13, wherein,
the platform server determines index information for distribution in recorded index information;
the managing server determines to-be-distributed data segments according to the determined index information for distribution; assigns distributed storage objects to the to-be-distributed data segments; and stores the to-be-distributed data segments into the distributed storage objects; and
the platform server updates the index information for distribution;
or, the system further comprises an auditing server,
the platform server determines index information for distribution in recorded index information;
the auditing server determines to-be-distributed data segments according to the determined index information for distribution; assigns distributed storage objects to the to-be-distributed data segments; and stores the to-be-distributed data segments into the distributed storage objects; and
the platform server updates the index information for distribution.

16. The system according to claim 13, wherein,
the platform server determines index information for construction in recorded index information; wherein, the index information for reconstruction contains information of a fault storage object;
the managing server reads, according to information of fault-free storage objects contained in the index information for reconstruction, target data segments from the fault-free storage objects, the target data segments being data segments of the data to be reconstructed associated with the information index for reconstruction; obtains a restored segment through reconstruction with the target data segments; and stores the restored segment into an assigned storage object; and
the platform server updates the index information for reconstruction;
or, the system further comprises an auditing server,
the platform server determines index information for construction in recorded index information; wherein, the index information for reconstruction contains information of a fault storage object;
the auditing server reads, according to information of fault-free storage objects contained in the index information for reconstruction, target data segments from the fault-free storage objects, the target data segments being data segments of the data to be reconstructed associated with the information index for reconstruction; obtains a restored segment through reconstruction with the target data segments; and stores the restored segment into an assigned storage object; and
the platform server updates the index information for reconstruction.

17. The system according to claim 13, further comprising a storage server containing multiple storage objects;
the storage server reports operating status information of the storage objects to the platform server, so that the platform server assigns storage objects to to-be-stored data, assigns distributed storage objects to the to-be-distributed data segments, and determines index information for reconstruction, based on the operating status information reported by the storage server.

* * * * *